United States Patent [19]

Kasai

[11] Patent Number: 4,721,075

[45] Date of Patent: Jan. 26, 1988

[54] DIESEL ENGINE

[75] Inventor: Hiroshi Kasai, Wako, Japan

[73] Assignee: Honda Giken Kogyo Kabushiki Kaisha, Tokyo, Japan

[21] Appl. No.: 941,129

[22] Filed: Dec. 12, 1986

[30] Foreign Application Priority Data

Jan. 8, 1986 [JP] Japan .................................. 61-1667

[51] Int. Cl.$^4$ .......................... F01L 1/12; F01L 1/46
[52] U.S. Cl. ............................ 123/90.23; 123/508; 123/90.27; 123/90.31; 123/90.4
[58] Field of Search ................. 123/508, 509, 90.22, 123/90.23, 90.27, 90.31, 90.39, 90.4, 90.44

[56] References Cited

U.S. PATENT DOCUMENTS

| | | | |
|---|---|---|---|
| 2,040,847 | 5/1936 | Hesselman et al. | 123/495 |
| 4,538,561 | 9/1985 | Amemori et al. | 123/90.44 |
| 4,615,323 | 10/1986 | LeBlanc et al. | 123/508 |

FOREIGN PATENT DOCUMENTS

| | | | |
|---|---|---|---|
| 138730 | 4/1985 | European Pat. Off. | 123/508 |
| 340892 | 5/1936 | Italy | 123/508 |
| 58-204962 | 11/1983 | Japan . | |
| 59-119061 | 7/1984 | Japan . | |
| 60-8462 | 1/1985 | Japan . | |
| 60-6586 | 3/1985 | Japan . | |
| 60-9389 | 4/1985 | Japan . | |
| 2090911 | 7/1982 | United Kingdom | 123/90.44 |
| 2141780 | 1/1985 | United Kingdom | 123/90.31 |

*Primary Examiner*—Ira S. Lazarus
*Attorney, Agent, or Firm*—Armstrong, Nikaido, Marmelstein & Kubovcik

[57] ABSTRACT

In a diesel engine having a valve operating chamber within which are accommodated intake and exhaust valves, driving system operable to open and close under control those valves, and a unit injector consisting of an injection nozzle and an injection pump united together, it is arranged that the unit injector is designed into an L-shape with its horizontally extending portion being formed by the injection pump, a cam shaft being located below the injection pump, and first and second rocker shafts of the driving system being disposed on both sides of the unit injector.

5 Claims, 3 Drawing Figures

DIESEL ENGINE

BACKGROUND OF THE INVENTION

1. Field of the Invention

The present invention relates to diesel engines and more particularly to an improvement in diesel engines of the type having an intake valve, an exhaust valve, a unit injector consisting of an injection nozzle and an injection pump connected integrally with each other, and a cam shaft for driving those intake and exhaust valves and injection pump.

2. Description of the Prior Art

Diesel engines of the mentioned type have already been made known, for example, as has been described in Japanese utility model registration publication kokoku No. 6586/1985.

In conventional diesel engines, an injection nozzle and an injection pump which together constitute a unit injector are serially connected with each other to form a rectilinear configuration as a whole so that the unit is forced to project upwards highly above the upper wall defining a cylinder and moreover, driving system components for the injection pump, that is, a cam shaft or rocker arms have to be arranged upwardly of the unit injector. This largely increases the total height of engine and so poses a problem of making it difficult to provide a compact engine.

SUMMARY OF THE INVENTION

The invention has been proposed in view of these circumstances and has as its object the provision of a diesel engine of the afore-mentioned type having a compact structure wherein a unit injector and its associated driving system as well as components for driving intake and exhaust valves are arranged so as not to hamper such compactness.

In order to achieve the above object, the invention is characterized by the features that an injection nozzle and an injection pump are united together into a unit injector of L-shaped configuration, a cam shaft is located to pass below the injection pump, and a pair of first and second rocker shafts are arranged separately on both sides of the unit injector to rockably support thereon an intake rocker arm and an exhaust rocker arm which operatively connect the cam shaft and the intake and exhaust valves, respectively.

Since the unit injector is configured into an L-shape, the injection pump is permitted to lay horizontally and has no portion projecting high above a cylinder. Further since the cam shaft is disposed below the injection pump and the first and second rocker shafts, which support intake and exhaust rocker arms, are disposed separately on both sides of the unit injector, the driving systems for the injection pump and for the intake and exhaust valves can be located at low levels to have no upward projections appearing above the injection pump. Accordingly, the valve operating chamber can have its ceiling wall lowered to a level near a short-height unit injector without being interfered by said driving systems, thus allowing an engine to have a largely reduced total height and to be compact as compared with conventional engines.

The above and other objects and advantageous features of the invention will become apparent from the following detailed description of an embodiment in conjunction with the accompanying drawings.

BRIEF DESCRIPTION OF THE DRAWINGS

The accompanying drawings show one preferred embodiment according to the invention wherein.

DESCRIPTION OF PREFERRED EMBODIMENT

Figure 1:
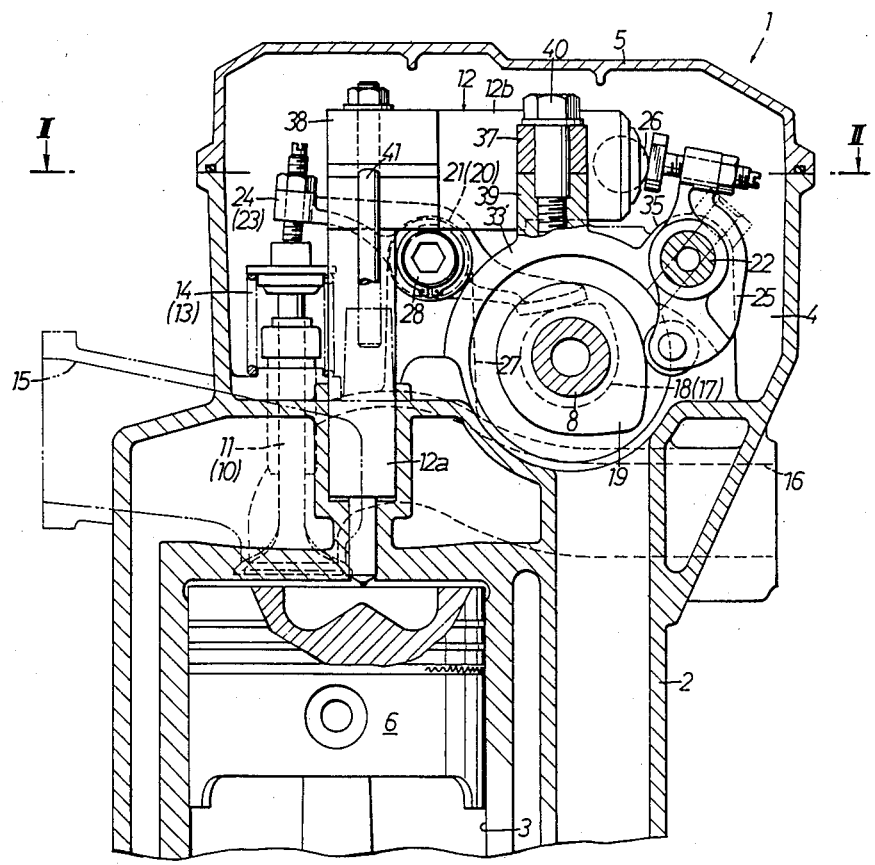
FIG. 1 is a side view in longitudinal section of essential portions of a diesel engine (a sectional view taken along the line I—I of FIG. 1)

Hereinafter, one embodiment according to the invention will be explained with reference to the drawings. First referring to FIG. 1, a diesel engine 1 has a body 2 which is formed therein with an upstanding cylinder 3, a valve operating chamber 4 positioned above the cylinder 3 and a crank chamber, not shown, located below the cylinder. The valve operating chamber 4 has its upper wall defined by a head cover 5 detachably affixed to the engine body 2. Into the cylinder 3 is slidably fitted a piston 6 which is operatively connected to a crankshaft, not shown, disposed in the above-mentioned crank chamber.

At a lower position within the valve operating chamber 4 there is disposed a cam shaft 8 extending in a horizontal direction which is driven from the crankshaft via a belt type timing transmission device 7. This cam shaft 8 drives an intake valve 10, an exhaust valve 11 and a unit injector 12.

The intake and exhaust valves 10 and 11 are mounted onto the upper wall of the cylinder 3 so as to stand vertically therefrom and are located in side-by-side arrangement along the axis of cam shaft 8 on one side of the shaft. These valves are urged toward their closed positions by respective valve springs 13 and 14.

The intake and exhaust valves 10 and 11 open and close intake and exhaust ports 15 and 16, respectively, which rise from the ceiling surface of the cylinder 3 and are bent in directions opposite to each other and substantially perpendicular to the axis of cam shaft 8 to have their outer ends opened at opposite side surfaces of the engine body 2. One of these ports 15 and 16 (the exhaust port 16 in the illustrated embodiment) passes underneath the cam shaft 8.

A unit injector 12 is constituted by an injection nozzle 12a and an injection pump 12b which are connected unitarily into an L-shaped configuration. Injection nozzle 12a is disposed standing upright or vertically from the upper wall of the cylinder 3 at a position intermediate between the intake and exhaust valves 10 and 11 in the axial direction of the cam shaft 8 and further between these valves 10, 11 and the cam shaft 8. The nozzle 12a has its injection port exposed to the interior of cylinder 3. Injection pump 12b is extended horizontally from the upper end of the injection nozzle 12a in a direction substantially perpendicular to the axis of the cam shaft 8 and going apart from the intake and exhaust valves 10 and 11. The cam shaft 8 runs below the injection pump 12b.

Figure 2:
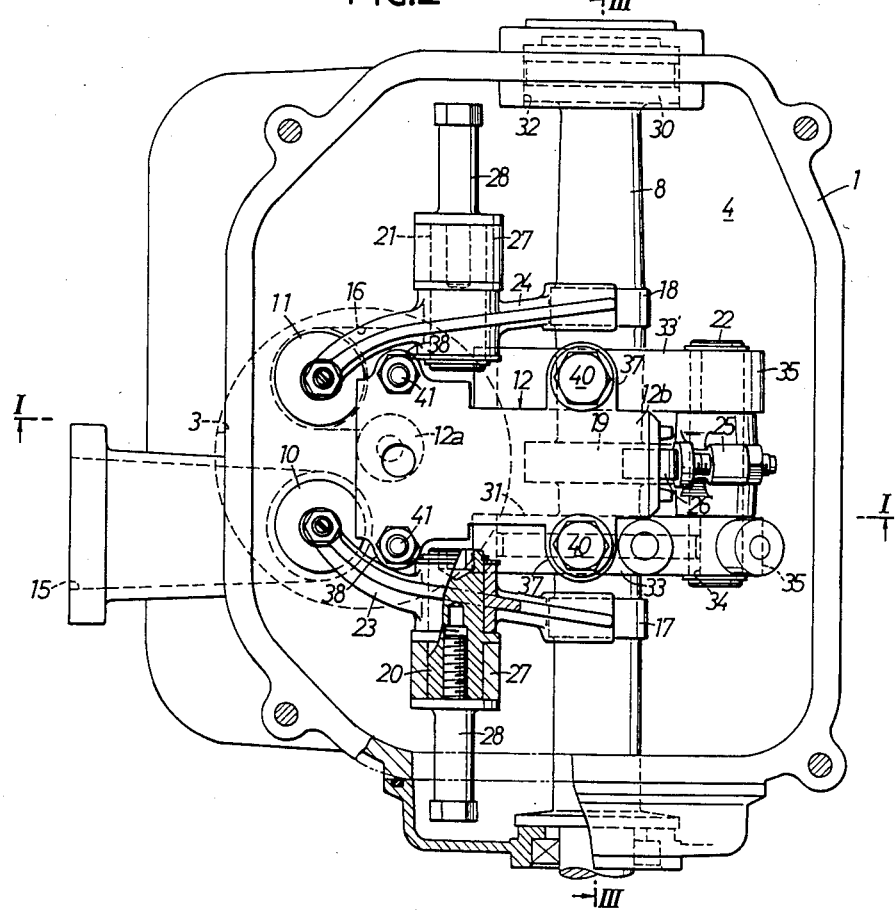
FIG. 2 is a sectional view taken along the line II—II of FIG. 1
Figure 3:
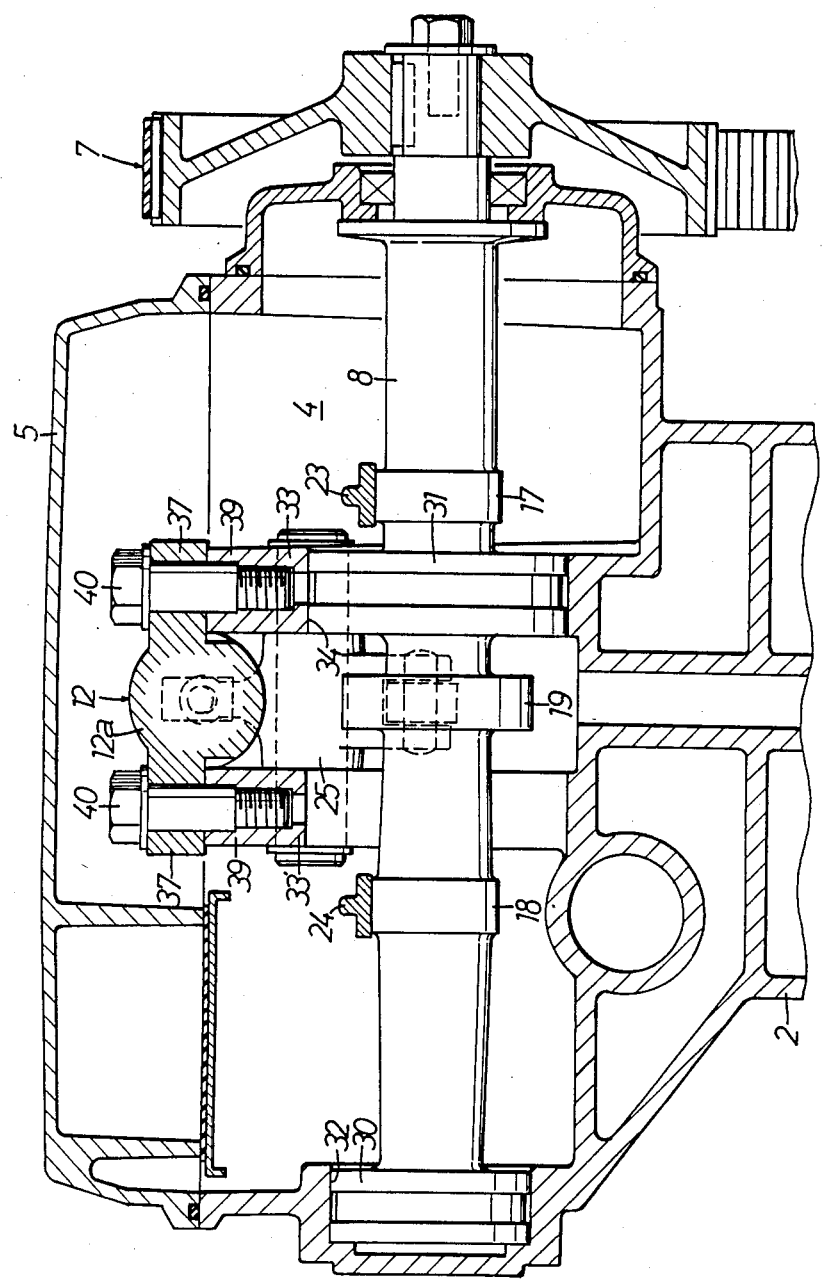
FIG. 3 is a sectional view taken along the line III—III of FIG. 2.

With reference to FIGS. 2 and 3, the cam shaft 8 is formed with an intake cam 17, an exhaust cam 18 and an injection cam 19 around its outer periphery, of which injection cam 19 is disposed at almost a central position in the axial direction of the cam shaft 8 and directly below the injection pump 12b whereas intake cam 17 and exhaust cam 18 are separated on axially opposite sides with the injection cam 19 located therebetween. First and second rocker shafts 20 and 21 are disposed on one side of the cam shaft 8 and respectively support thereon intake and exhaust rocker arms 23 and 24 in substantially horizontal postures. The intake and exhaust cams 17, 18 are in operative connection with the intake and exhaust valves 10, 11 via the rocker arms 23, 24, respectively. A third rocker shaft 22 is disposed on the other side of the cam shaft 8 with respect to the shafts 20 and 21 and carries an injection rocker arm 25 thereon such that the arm 25 extends substantially vertically and is suspended to a position sideward of the cam shaft 8. The injection cam 19 is in operative connection via the injection rocker arm 25 with a push roller 26 provided at the tip end of the injection pump 12b.

The first and second rocker shafts 20 and 21 are coaxially arranged on opposite sides of the unit injector 12 so as to extend parallel with the cam shaft 8 but in a separated manner from each other in the axial direction. These rocker shafts 20, 21 are secured by bolts 38, 28 to a pair of support posts 27, 27 stood upright from the bottom wall of the valve operating chamber 4 and almost parallel with the injection nozzle 12a.

Cam shaft 8 is also provided with a first journal 30 and a second journal 31 on its axial one end portion and intermediate portion, the first journal 30 being positioned outward of the exhaust cam 18 in the illustrated embodiment and rotatably supported on a bearing 32 formed on one side wall of the valve operating chamber 4 and the second journal 31 taking a position between the intake cam 17 and the injection cam 19 in the illustrated embodiment and being rotatably carried by a bearing 34 which is formed in a support wall 33 rising from the bottom wall of the valve operating chamber 4.

Also from the bottom wall of the valve operating chamber 4 rises another support wall 33' at a position inward of the cam 18 so as to oppose the support wall 33 with the injection cam 19 interposed therebetween. A pair of bosses 35 and 35 are continuously extended from respective one sides of those support walls 33 and 33' and carry the third rocker shaft 22 at both ends thereof in a posture parallel with the cam shaft 8.

The unit injector 12 includes two pairs of tabs 37, 37 and 38, 38 which respectively in pairs project from opposite sides of the injection pump 12b at tip end and basal end portions thereof. Tabs 37, 37 on tip end side are secured, by means of bolts 40, 40, to a pair of thread bosses 39, 39 formed continuously on upper portions of the support walls 33, 33' at positions above the cam shaft 8. Meanwhile, tabs 38, 38 on basal end side are supported by a pair of stud bolts 41, 41, which are implanted to the bottom wall of the valve operating chamber 4, at positions between the intake valve 10 and first rocker shaft 20 and between the exhaust valve 11 and second rocker shaft 21.

As has been described above, the intake and exhaust valves 10 and 11, unit injector 12 and their associated driving systems are arranged in quite a compact manner within the valve operating chamber 4 while avoiding unnecessary mutual interferences, thereby contributing greatly to achieving a compact engine.

Next, the operation of this embodiment will be described.

During operation of the engine 1, when the cam shaft 8 is driven and rotated by the crankshaft, not shown, through the timing transmission device 7, the intake cam 17 gives a lifting action to the intake rocker arm 23 in the air intake stroke to rock the arm 23 around the first rocker shaft 20 thus causing a valve-opening action of the intake valve 10. This allows air to be sucked into the cylinder 3 from the intake port 15. At the last stage of the compression stroke, the lifting action of the injection cam 19 rotates the injection rocker arm 25 around the third rocker shaft 22 thereby to actuate the injection pump 12b and cause fuel to be injected from the injection nozzle 12a into the cylinder 3. After the injected fuel is fired by the heat of compression generated from sucked air, the operation cycle shifts into the expansion stroke and in the next exhaust stroke the exhaust cam 18 effects a lifting action to rock the exhaust rocker arm 24 around the second rocker shaft 21 and then moves the exhaust valve 11 to an open position, which permits the exhaust gas to be discharged outside from the cylinder 3 through the exhaust port 16.

In the above-described diesel engine 1, the unit injector 12 has an L-shaped configuration as a whole and is constituted by an injection nozzle 12a mounted upstandingly on the upper wall of the cylinder 3 and an injection pump 12b disposed extending horizontally from the upper end of the injection nozzle 12a, as a result of which the height of unit injector 12 can be reduced to be about one half of those of conventional ones and the injection pump 12b can be devoid of portions protruding upwards high above the cylinder 3. Moreover, the cam shaft 8 is disposed below the injection pump 12b and the first and second rocker shafts 20, 21, which carry the intake and exhaust rocker arms 23, 24, are arranged separately on opposite sides of the unit injector 12 so that all the driving components for the injection pump 12b as well as for the intake and exhaust valves 10, 11 can be positioned at such low levels as to have no upward projections appearing above the injection pump 12b. Consequently, the ceiling wall of the valve operating chamber 4, that is, the head cover 5, can be located closer to the short-height unit injector 12 without causing interference with the driving components thereby to enable the total height of the engine 1 to be reduced sufficiently.

I claim:

1. A diesel engine comprising an intake valve, an exhaust valve, a unit injector which is constituted by unitarily connecting an injection nozzle and an injection pump, and a cam shaft for drivin said intake and exhaust valves and said injection pump, wherein said injection nozzle and said injection pump are connected together into an L-shaped configuration, said cam shaft being located to pass below the injection pump, a pair of first and second rocker shafts being disposed separately on opposite sides of said unit injector, these first and second rocker shafts rockably carrying an intake rocker arm which operatively connects said intake valve and said cam shaft and an exhaust rocker arm operatively connecting the exhaust valve and said cam shaft, respectively.

2. A diesel engine as set forth in claim 1, further comprising a cylinder and a piston slidably fitted in the cylinder, said injection nozzle being disposed in a valve operating chamber arranged above said cylinder, said injection nozzle standing upright within the chamber substantially parallel with the intake and exhaust valves, said injection pump extending from an upper end of the injection nozzle in a direction horizontal and substantially perpendicular to an axis of the cam shaft.

3. A diesel engine as set forth in claim 1 or 2, wherein said first and second rocker shafts are disposed parallel with said cam shaft on one side of the cam shaft, an intake cam and an exhaust cam which are in operative connection with said intake and exhaust rocker arms, respectively, being provided on the cam shaft at axially spaced positions, and wherein a third rocker shaft is disposed parallel with the cam shaft on that side of the cam shaft which is opposite to the side at which said first and second rocker shafts are located, an injection rocker arm being rockably carried and suspended on said third rocker shaft, said injection rocker arm having one of opposite ends placed in operative connection with a tip end of said injection pump and further having the other end placed in operative connection with an injection cam mounted on said cam shaft between the intake and exhaust cams.

4. A diesel engine as set forth in claim 1, further comprising a member for rotatably supporting said cam shaft, said supporting member serving also as a means for supporting the injection pump.

5. A diesel engine comprising a cylinder having a piston slided therein, a valve operating chamber defined above the cylinder, a cam shaft disposed at a lower position within the valve operating chamber to extend horizontally, intake and exhaust valves disposed standing upright in side-by-side arrangement along an axis of the cam shaft and on one of opposite sides of the cam shaft, an injection nozzle disposed standing upright at a position among said inlet and exhaust valves and said cam shaft, and an injection pump integrally extending from an upper end of the injection nozzle horizontally and in a direction substantially perpendicular to the axis of the cam shaft to pass above the cam shaft, wherein first and second rocker shafts are arranged parallel with the cam shaft on opposite sides of the injection nozzle and injection pump so as to interpose these nozzle and pump therebetween and wherein a third rocker shaft is arranged parallel with the cam shaft and on the other side of the cam shaft opposite to the first and second rocker shafts, intake and exhaust rocker arms being carried on the first and second rocker arms, respectively, and being in operative connection with said intake and exhaust valves, respectively, while an injection rocker arm being carried on the third rocker shaft and being in operative connection with the injection pump.

* * * * *